Aug. 29, 1961  S. C. ROCKAFELLOW  2,998,561
CONTROL CIRCUIT FOR A STORED-ENERGY WELDER
Filed May 25, 1956

INVENTOR.
STUART C. ROCKAFELLOW
BY
Woodhams, Blanchard y Flynn
ATTORNEYS

United States Patent Office 2,998,561
Patented Aug. 29, 1961

2,998,561
CONTROL CIRCUIT FOR A STORED-ENERGY WELDER
Stuart C. Rockafellow, Plymouth, Mich., assignor to Robotron Corporation, Detroit, Mich., a corporation of Michigan
Filed May 25, 1956, Ser. No. 587,319
7 Claims. (Cl. 320—1)

This invention relates to a control circuit for a stored-energy, resistance welding machine and, more particularly, relates to a control circuit for a capacitor discharge welding machine, which is characterized by circuitry for ensuring that the charge built up across the capacitor and, therefore, the energy utilized to make the weld, is the same for each welding cycle, regardless of fluctuations in the line voltage supplied to the circuit.

In the use of stored-energy welders, and, particularly, stored-energy welders of the capacitor discharge type, it is desirable that the same amount of energy be utilized for each weld. Thus, it is desirable that the capacitor be charged to the same extent for each of a series of successive welds. However, it frequently happens that the line voltage supplied to the control circuit fluctuates between successive welding cycles which, with conventional controls for this type of welder, results in a different charge on the capacitor for each cycle and, therefore, a variation in the amount of energy imparted to successive welds.

Further, it frequently happens that after the capacitor is charged to the desired degree and the supply of potential thereto is terminated, the discharge of the capacitor through the welding transformer is delayed for an appreciable, though short, length of time. During such delay, a portion of the charge in the capacitor may drain out, thereby diminishing the charge thereon, which diminished charge is afterwards supplied to the welding transformer. Since this delay does not occur in every cycle and, also, may vary from one cycle to another, it is apparent that differing amounts of energy may be supplied to the welder in successive cycles. Conventional control circuits for stored-energy welders, insofar as I am aware, do not compensate for variations in supply voltage and/or the occurrence of variable time delays in the discharge of the energy-storing means to ensure that the energy-storing means always has available the same amount of energy in each cycle of operation.

Accordingly, it is an object of this invention to provide a new and improved control circuit for a stored-energy welder.

It is a further object of this invention to provide a new and improved control circuit, as aforesaid, which employs simple circuitry and which is reliable in operation.

It is a further object of this invention to provide a new and improved welding control circuit, as aforesaid, in which voltage is supplied to the capacitor until said capacitor charges to the desired level, following which the supply of voltage is terminated, the supplying of such voltage being resumed if the charge on said capacitor diminishes below the desired level.

It is a further object of this invention to provide a new and improved welding control circuit, as aforesaid, in which the conduction of a tube is responsive to the charge existing on the capacitor, conduction of said tube effecting a termination of the charging of said capacitor when a charge of a predetermined level exists thereon, said tube causing reinitiation of the charging of said capacitor when the charge thereon diminishes below the desired level.

Other objects and advantages of this invention will become apparent to those acquainted with equipment of this type upon reading the following description and inspecting the accompanying drawings, in which:

FIGURE 1 is a circuit diagram of a preferred circuit embodying this invention.
FIGURE 2 illustrates a fragment of an alternate circuit.

*General description*

In general, the invention provides an energy-storing means, which receives energy from a suitable source of potential. A circuit, including a device responsive to the potential level of the energy stored in the energy-storing means, is connected to the source of power and disconnects the source of power from said energy-storing means when sufficient energy is stored therein to accomplish the welding operation in the desired fashion. The circuit will reconnect the source of power to the energy-storing means when the potential level of the energy stored therein drops below the desired value.

*Detailed description*

Figure 1:
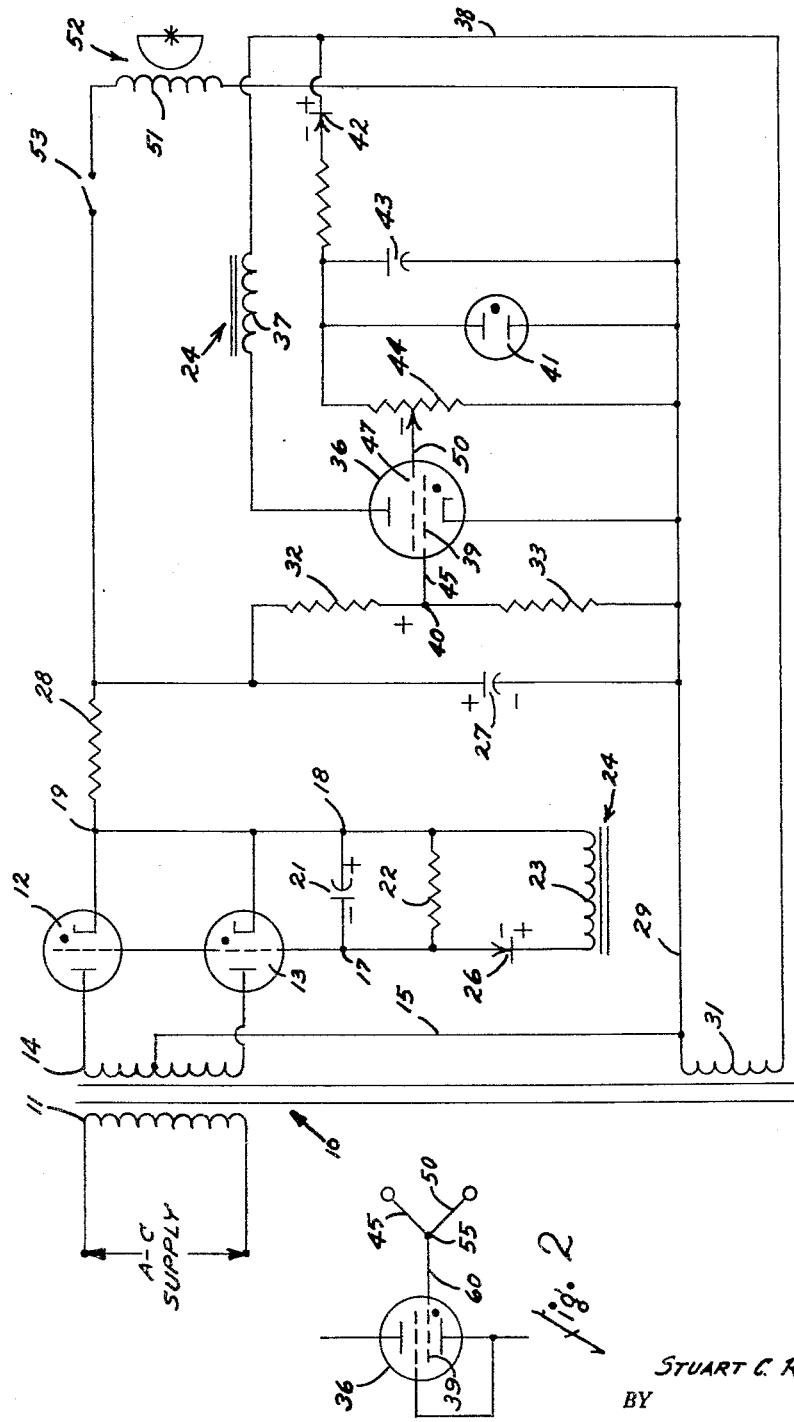

A source of potential, ordinarily an A.-C. supply, is connected to the primary winding 11 of an input transformer 10. The anodes of a pair of thyratrons 12 and 13 are connected to the respective ends of the secondary winding 14 of transformer 10 for rectifying the output therefrom. A conductor 15 is connected to a center tap on secondary winding 14 and to a further conductor 29. The control electrodes of thyratrons 12 and 13 are connected together and to a junction point 17. The cathodes of the thyratrons 12 and 13 are connected together and to junction points 18 and 19. A valving capacitor 21 is connected between junction points 17 and 18. A resistance 22 is connected in parallel with capacitor 21. The secondary winding 23 of a control transformer 24 is connected to the opposite ends of resistance 22 through a rectifier 26. The rectifier 26 is sensed so that capacitor 21 is charged in such a polarity as to block conduction of thyratrons 12 and 13 when the secondary winding 23 is energized.

The junction point 19 is connected to one side of a load capacitor 27 through a resistance 28. The resistance 28 delays the charging of the capacitor, each succeeding half-cycle charging the capacitor to a higher value. The other side of capacitor 27 is connected to conductor 29. Conductor 29 is connected to one end of a further secondary winding 31 of the input transformer 10. The number of turns in the secondary windings 14 and 31 is such that the voltage induced in secondary winding 14 is many times larger than the voltage in secondary winding 31, e.g., winding 14 may have a voltage of 1400 volts therein, while the voltage in winding 31 may only be 115 volts.

A pair of series-connected resistances 32 and 33 are connected in parallel with capacitor 27. The control electrode 39 of a thyratron 36 is connected to a junction point 40 between the resistances 32 and 33 by a conductor 45. The value of resistances 32 and 33 is selected so that a voltage, which is relatively small in comparison with the voltage on capacitor 27, is imposed on the control electrode 39 when the capacitor is charged. Thus, for example, if the load capacitor 27 is charged between 1500 and 3000 volts for a welding operation, resistance 32 will be many times as large as resistance 33 in order that a relatively small voltage, such as 100 to 200 volts, is applied on control electrode 39.

The thyratron 36 has its cathode connected to conductor 29. Its anode is connected through the primary winding 37 of transformer 24 to a conductor 38 and thence to the other end of the further secondary winding 31 of transformer 10.

A voltage regulator tube 41 is connected to conductor 29 and through a rectifier 42 to conductor 38. The rectifier 42 is sensed to permit current flow from conductor 29 to conductor 38 and not vice versa. The voltage regulator tube may be a conventional cold cathode diode operating with a normal glow discharge. A smoothing capacitor 43 is connected in parallel with the voltage regulator tube. A potentiometer 44 is also connected in parallel with the voltage regulator tube. The movable contact of the potentiometer 44 is connected by conductor 50 to the screen grid 47 of thyratron 36. This arrangement of the voltage regulator tube 41 and potentiometer 44 causes a constant potential to be applied to the screen grid 47 of thyratron 36, regardless of fluctuations in the power source. The potential applied to screen grid 47 is of opposite polarity with respect to the potential applied to control electrode 39. Thus, in order to fire thyratron 36, the potential on the control electrode 39 must be made sufficiently positive to overcome whatever portion of the negative bias on screen grid 47 is required by the tube characteristics for rendering thyratron 36 conductive under the voltage conditions of the circuit.

The capacitor 27 is connected to the winding 51 of the welding transformer 52 through switch 53. Thus, when switch 53 is closed by any suitable control circuit, as, for example, by a timing device or by a pressure switch actuated when the welding electrodes are pressed onto the work with a predetermined pressure, the charge heretofore built up on the capacitor may discharge through the primary winding 51 in known fashion to effect the welding operation.

Operation

The voltage supplied to primary winding 11 of input transformer 10 is suitably stepped up by the secondary winding 14 of said transformer and is fed to thyratrons 12 and 13, which rectify this voltage and feed same through resistance 28 to capacitor 27. As capacitor 27 charges, the voltage applied to control electrode 39 of thyratron 36 simultaneously increases. Thyratron 36 is normally non-conductive because of the negative potential applied to its screen grid 47, said potential applied to screen grid 47 being maintained constant by voltage regulator tube 41. When the charge on load capacitor 27 reaches the desired level for effecting the welding operation, the voltage on control electrode 39, by suitable selection of circuit constants, will become sufficient to overcome the biasing potential on screen grid 47 to render thyratron 36 conductive. When the thyratron 36 conducts, the primary winding 37 of transformer 24 will be energized and will energize the secondary winding 23. This will effect charging of capacitor 21, which will impose a negative potential upon the control electrodes of thyratrons 12 and 13. The thyratrons 12 and 13 will be rendered non-conductive and this will terminate charging of load capacitor 27. With the capacitor 27 fully charged, the circuit is now in condition for a welding operation. Upon closure of the switch 53, a surge of welding current will pass through the primary winding 51 and will effect a weld in conventional fashion.

It frequently happens that, if the load capacitor is not discharged immediately through the work, the charge on the load capacitor 27 will tend to leak somewhat through the charging system and thereby reduce the energy stored therein to a value below the desired welding potential. If such should occur, the voltage on control electrode 39 will decrease, which results in thyratron 36 becoming non-conductive. This will terminate the charging of the capacitor 21 which, since said capacitor 21 is constantly discharging through resistance 22, will quickly render the thyratrons 12 and 13 again conductive and thereby send further charging current through resistance 28 to the capacitor 27. This charging of load capacitor 27 will again continue until it is fully charged and the thyratron 36 becomes conductive. Thus, charging of capacitor 27 will continue, and even though stopped, will be reinstated, whenever and as long as thyratron 36 is non-conductive, and such may be controlled by utilizing the potentiometer 44 for setting the potential at which said thyratron conducts. In this connection, it should be noted that voltage regulator tube 41 retains a constant biasing potential upon the screen grid 47 of thyratron 36. Thus, normal fluctuations in the supply voltage will have no effect upon the potential level to which the load capacitor 27 is charged.

Figure 2:
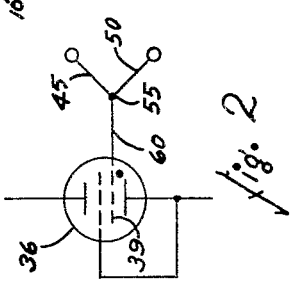

While the circuit diagram discloses that the thyratron 36 has two grids, it is apparent that a thyratron having only one control grid may be used, if desired. Thus, it is possible that the output from potentiometer 44, instead of being fed to screen grid 47, can be fed to the control electrode 39 and buck the voltage applied to the electrode 39 from the capacitor 27. This is illustrated in FIGURE 2, wherein conductors 50 and 45 are connected to a junction point 55, the junction point 55 being connected to electrode 39 by conductor 60.

This, and other modifications of the embodiment herein particularly chosen for illustrative purposes, will be apparent to persons acquainted with apparatus of this general type and, accordingly, the claims hereinafter appended are to be interpreted as covering such modifications, excepting as said claims by their own terms expressly recite otherwise.

I claim:

1. A control circuit for a stored-energy welder, including, in combination: a source of alternating potential; a transformer having a primary winding and a secondary winding, the primary winding of said transformer being connected to said source; a pair of electric space discharge devices connected to the secondary winding of said transformer for rectifying the output thereof, said devices each having a control electrode; a first capacitor connected to said control electrodes and adapted to control conduction of said pair of electric space discharge devices; a second capacitor connected to said pair of space discharge devices; circuitry, including a third electric space discharge device connected to said first capacitor and to said control electrodes, conduction of said third electric space discharge device being responsive to the appearance of a predetermined potential across said second capacitor, conduction of said third electric space discharge device causing said first capacitor to block conduction of said pair of electric space discharge devices, whereby said source of potential is disconnected from said second capacitor upon the appearance of a charge of predetermined potential across said second capacitor.

2. The circuit defined in claim 1 wherein said electric space discharge devices are thyratrons, each thyratron having an anode, a cathode and control electrode means, and including a voltage regulator circuit connected to a control electrode means of said third thyratron for supplying a regulating potential thereto; a voltage divider circuit in parallel with said second capacitor; a conductor connecting a point between the ends of said voltage divider circuit to said control electrode means of said third thyratron for supplying a controlling potential thereto; interaction of said regulating potential and said controlling potential determining the conductive condition of said third thyratron.

3. The device defined in claim 2 wherein the regulating potential and the controlling potential are of opposite polarities with respect to each other.

4. The combination of claim 2, including a control transformer, said control transformer having a primary winding and a secondary winding, the primary winding of said control transformer being connected to the anode of said third thyratron, the secondary winding of said control transformer being connected to said first capacitor, and said voltage regulator circuit including a voltage regulator tube and a potentiometer connected in parallel therewith and to said control electrode means of said third thyratron.

5. A control circuit for a stored-energy welder, including, in combination: a source of alternating potential; a transformer having a primary winding and a secondary winding, the primary winding of said transformer being connected to said source; a pair of thyratrons, each of said thyratrons having an anode, a cathode and a control electrode; means connecting the anodes of said thyratrons to the respective ends of the secondary winding of said transformer; means connecting the control electrodes of said thyratrons together; a first capacitor connected between said control electrodes and the cathodes of said thyratrons; a second capacitor and circuitry connecting said second capacitor to the primary winding of a welding transformer; circuitry connecting the cathodes of said thyratrons to one side of said second capacitor, and a conductor connecting the other side of said second capacitor to said secondary winding at a point between its ends; a pair of resistances connected in parallel with said second capacitor; a third thyratron having an anode, a cathode and control electrode means; means connecting said control electrode means of said third thyratron to a point between said two resistances; a voltage regulator circuit, including a voltage regulator tube and a potentiometer connected in parallel therewith, said potentiometer having a movable contact, said movable contact of said potentiometer being connected to said control electrode means of said third thyratron; a control transformer having a primary winding and a secondary winding; means connecting the primary winding of said control transformer to the anode of said third thyratron; a rectifier; and means connecting the secondary winding of said control transformer through said rectifier to said first capacitor.

6. A control circuit for a stored energy welder including in combination: a source of potential; a capacitor connected to said source of potential; switch means having a control element, said switch means being connected between said source and said capacitor whereby said source may be connected to, or disconnected from, said capacitor by operation of the control element of said switch means; an electric space discharge device having an output terminal and having control electrode means for controlling the conductivity thereof; means connecting said control electrode means to a point in parallel wtih said capacitor; a voltage regulator circuit and means connecting said voltage regulator circuit to said control electrode means so that said voltage regulator circuit supplies a blocking potential to said control electrode means, said capacitor, when charged, being adapted to supply an unblocking potential to said control electrode means whereby said device will be rendered conductive upon the appearance of a predetermined potential across said capacitor; means connecting said output terminal of said device to said control element of said switch means for controlling the operation thereof, whereby said source is disconnected from said capacitor upon the appearance of a charge of predetermined potential across said capacitor, said voltage regulator circuit including a voltage regulator tube; a rectifier; means connecting said tube through said rectifier to said source of said potential; a potentiometer having a movable contact and means connecting said potentiometer in parallel with said voltage regulator tube; and means connecting said movable contact to said control electrode means of said electric space discharge device.

7. A control circuit for a stored-energy welder including in combination: a source of potential; a capacitor connected to said source of potential; switch means having a control element, said switch means being connected between said source and said capacitor whereby said source may be connected to, or disconnected from, said capacitor by operation of the control element of said switch means; an electric space discharge device having an output terminal and having control electrode means for controlling the conductivity thereof; a plurality of serially connected resistances connected in parallel with said capacitor; means connecting a point intermediate said resistances to said control electrode means; a voltage regulator circuit and means connecting said voltage regulator circuit to said control electrode means so that said voltage regulator circuit supplies a blocking potential to said control electrode means, said capacitor, when charged, being adapted to supply an unblocking potential to said control electrode means whereby said device will be rendered conductive upon the appearance of a predetermined potential across said capacitor; means connecting said output terminal of said device to said control element of said switch means for controlling the operation thereof, whereby said source is disconnected from said capacitor upon the appearance of a charge of predetermined potential across said capacitor.

References Cited in the file of this patent

UNITED STATES PATENTS

| | | |
|---|---|---|
| 2,278,431 | Klemperer | Apr. 7, 1942 |
| 2,294,388 | Dawson | Sept. 1, 1942 |
| 2,340,694 | Rogers | Feb. 1, 1944 |
| 2,413,941 | Bixby | Jan. 7, 1947 |
| 2,426,256 | Zenov | Aug. 26, 1947 |
| 2,472,838 | Klemperer | June 14, 1949 |
| 2,498,640 | Beck | Feb. 28, 1950 |
| 2,630,557 | Bixby | Mar. 3, 1953 |
| 2,775,731 | Schalk | Dec. 25, 1956 |